United States Patent
Lee

(10) Patent No.: US 7,489,863 B2
(45) Date of Patent: Feb. 10, 2009

(54) IMAGE SIGNAL PROCESSING APPARATUS AND METHOD THEREOF IN MOBILE COMMUNICATIONS TERMINAL

(75) Inventor: Tae-Haeng Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 271 days.

(21) Appl. No.: 11/191,794

(22) Filed: Jul. 27, 2005

(65) Prior Publication Data
US 2006/0024047 A1 Feb. 2, 2006

(30) Foreign Application Priority Data
Jul. 27, 2004 (KR) ........... 10-2004-0058669

(51) Int. Cl.
*G03B 17/48* (2006.01)
(52) U.S. Cl. ............ 396/429; 455/557; 455/561
(58) Field of Classification Search ........... 396/429, 396/427; 348/211.12, 333.01, 143, 239; 455/557, 561
See application file for complete search history.

(56) References Cited

U.S. PATENT DOCUMENTS

| | | | |
|---|---|---|---|
| 6,628,326 B1 * | 9/2003 | Manico et al. ......... 348/211.12 |
| 2003/0078034 A1 * | 4/2003 | Tsutsumi et al. ........... 455/412 |
| 2004/0021792 A1 * | 2/2004 | Yasui .................... 348/373 |
| 2004/0203416 A1 * | 10/2004 | Hata et al. ............... 455/67.7 |
| 2004/0204010 A1 * | 10/2004 | Tassberg et al. .......... 455/550.1 |
| 2005/0037788 A1 * | 2/2005 | Ishida .................... 455/502 |
| 2005/0046740 A1 * | 3/2005 | Davis .................... 348/373 |
| 2005/0052526 A1 * | 3/2005 | Kim ..................... 348/14.02 |
| 2005/0186946 A1 * | 8/2005 | Takahashi ............... 455/413 |
| 2005/0250531 A1 * | 11/2005 | Takebe et al. ........... 455/550.1 |
| 2006/0007351 A1 * | 1/2006 | Choi et al. ............... 348/374 |
| 2006/0268100 A1 * | 11/2006 | Karukka et al. ......... 348/14.01 |

FOREIGN PATENT DOCUMENTS

| | | |
|---|---|---|
| JP | 2003-060765 | 2/2003 |
| JP | 2003-189168 | 7/2003 |
| JP | 2004-004796 | 1/2004 |
| JP | 2004-064575 | 2/2004 |

* cited by examiner

*Primary Examiner*—W. B. Perkey
*Assistant Examiner*—Warren K Fenwick
(74) *Attorney, Agent, or Firm*—Lee, Hong, Degerman, Kang & Waimey

(57) ABSTRACT

An image signal processing apparatus and a method thereof which can simplify design of a circuit for controlling each of camera modules when a terminal has two camera modules therein, the image signal processing apparatus includes: first and second camera modules for capturing a subject; a digital signal processor for controlling each operation of the first and second camera modules and processing image signals captured by the first and the second camera modules; and a switch module for supplying control signals inputted through the digital signal processor to the first and second camera modules, and selectively outputting the image signals captured by the first and second camera modules to the digital signal processor.

17 Claims, 4 Drawing Sheets

IMAGE SIGNAL PROCESSING APPARATUS AND METHOD THEREOF IN MOBILE COMMUNICATIONS TERMINAL

CROSS-REFERENCE TO RELATED APPLICATIONS

Pursuant to 35 U.S.C. § 119(a), this application claims the benefit of earlier filing date and right of priority to Korean Application No. 10-2004-0058669, filed on Jul. 27, 2004, the contents of which are hereby incorporated by reference herein in its entirety.

BACKGROUND OF THE INVENTION

1. Field of the Invention

The present invention relates to a mobile communications terminal, and more particularly, to an image signal processing apparatus and a method thereof in a mobile communications terminal having a dual camera therein.

2. Description of the Background Art

According to the development of a mobile communication technology and increase in consumers' desires, mobile communications terminals having a variety of functions are being released. Recently, a mobile communications terminal having a camera therein has been so popular.

FIG. 1 is a perspective view of a mobile communications terminal having a camera therein.

In FIG. 1, a camera module 10 is mounted at a hinge unit of a mobile communications terminal (hereinafter, referred to simply as a "terminal"), and, though not illustrated in the drawing, may be mounted at a folder unit. A lens of the camera module 10 faces toward a subject to be captured in a state that a folder 12 is opened, and moves back and forth according to rotation of a knob 11. Accordingly, after selecting a camera capturing function of the terminal, a user allows the lens to face toward the subject to be captured by using the knob 11 and performs capturing operation.

FIG. 2 is a signal flow between the camera module 10 and a DSP (digital signal processor) 13 while the capturing operation is performed by a camera. With reference to FIG. 2, signal lines (data lines and control lines) between the camera module 10 and the DSP 13 are connected through a Flexible Printed Circuit Board (FPCB). The FPCB is a circuit board obtained by coating a 10-micrometer (µm)-thick thin Polyimide (PI) with copper. Since the FPCB is formed of a thin material and is likely to be bent, the FPCB is typically used as a substrate of a high-function terminal or as a connector.

Accordingly, when the user initiates the capturing operation, control signals outputted from the DSP 13 are inputted in the camera module 10 through control lines. The camera module 10 captures a subject according to the corresponding control signals and then transmits captured image data to the DSP 13 through data lines of the FPCB. The DSP converts the transmitted image data into image data in digital format, and then stores and transmits the image data in digital format if necessary.

However, since a mobile communications terminal in accordance with the conventional art has one camera module therein, circuit lines and a signal control between a camera module and a DSP are not complex. But, if one terminal has two cameras therein for video communication or according to a user's demand from now on, circuit design and control may be complicated.

For instance, assuming that a folder type terminal (a folder of a terminal) has two camera modules therein, that is, a camera module for capturing a subject (camera module 1) and a camera module for video communication (camera module 2), as shown in FIG. 3, the number of signal lines and connector pins between two camera modules and a DSP is doubled, compared when one camera module is mounted as shown in FIG. 2, and a control method thereof is more complicated. In particular, since a Flexible Printed Circuit Board (FPCB) on which the signal lines are formed is very expensive, if the number of the connector pins and circuit lines increases, the number of patterns increases. As a result, production costs increase.

SUMMARY OF THE INVENTION

Therefore, an object of the present invention is to provide signal line design of high efficiency and low costs that is appropriate when two camera modules are mounted and a control method thereof.

To achieve these and other advantages and in accordance with the purpose of the present invention, as embodied and broadly described herein, there is provided a method for processing an image signal in a mobile communications terminal including a first camera module and a digital signal processor for controlling an operation of the first camera module, processing an image signal captured by the first camera module and outputting the processed image signal to a control unit, comprising: connecting signal lines between the first camera module and the digital signal processor through a switch chip when a second camera module is mounted, supplying control signals for controlling the first and second camera modules by using the switch chip, and selectively outputting image signals captured by the first and second camera modules to the digital signal processor.

To achieve these and other advantages and in accordance with the purpose of the present invention, as embodied and broadly described herein, there is provided a method for processing an image signal in a mobile communications terminal including a first camera module and a digital signal processor for controlling an operation of the first camera module, processing an image signal captured by the first camera module and outputting the processed image signal to a control unit, comprising: connecting signal lines between the first camera module and the digital signal processor through a switch chip when a second camera module is mounted, supplying control signals for controlling the first and second camera modules by using the switch chip, and selectively outputting image signals captured by the first and second camera modules to the digital signal processor.

Preferably, the switch chip is located on a Flexible Printed Circuit Board (FPCB).

Preferably, the first camera module is used to capture a subject in an external direction of the terminal and the second camera module is used to capture a subject in an internal direction of the terminal.

Preferably, the first camera module is operated in a general camera module and the second camera module is operated in the video communication mode.

Preferably, both the first and second camera modules are operated in general camera mode/video communication mode.

Preferably, if the user selects the general camera mode in the general camera mode/video communication mode, the first camera is automatically selected, and the user performs capturing operation by selecting the first and second camera modules in the selected mode.

Preferably, if the user selects the video communication mode in the general camera mode/video communication mode, the second camera is automatically selected, and the user performs capturing operation by selecting the first and second modules in the selected mode.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention.

The present invention is to propose a mobile communications terminal having two camera modules therein, and in particular, circuit design and a control method thereof which can control the two camera modules with the same efforts made when the mobile communications terminal (hereinafter, referred to simply as a "terminal") has one module therein will be described.

For example, when two camera modules are installed, a signal line of each camera module will be connected to a DSP through a connector and a Flexible Printed Circuit Board (FPCB). In this case, the present invention controls the two camera modules by the same method of when one camera module is used by connecting the same number of signal lines used when one camera module is applied to the DSP through the connector and the FPCB and by supplying control signals to the two camera modules, respectively, by using a switch chip located on the FPCB.

When such circuit design in accordance with the present invention is implemented, connectors having a relatively small number of pins can be used. By using a small number of patterns, costs for the FPCB can be reduced. Above all, technical implementation is easy.

Figure 1:
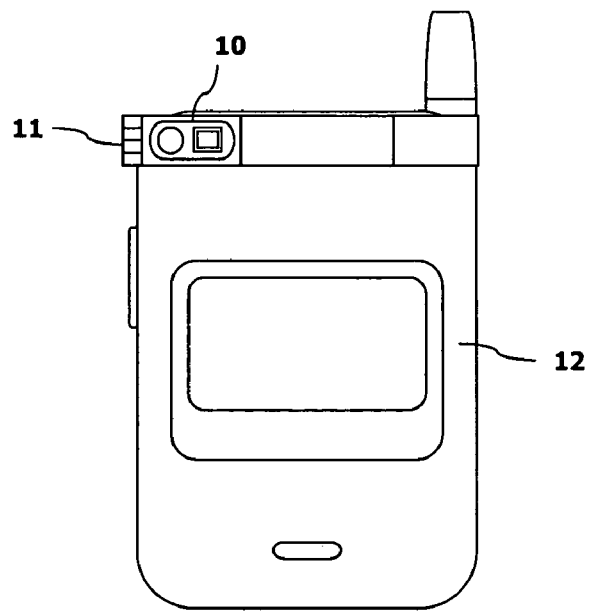
FIG. 1 illustrates on example of a conventional mobile communications terminal having one camera module therein.
Figure 2:
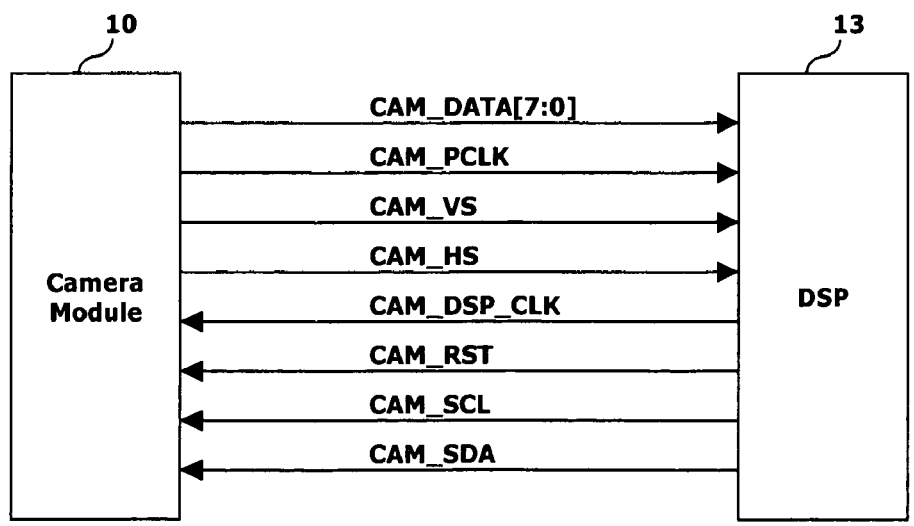
FIG. 2 illustrates signal lines and a signal flow between one conventional camera module and a DSP (Digital Signal Processor)
Figure 3:
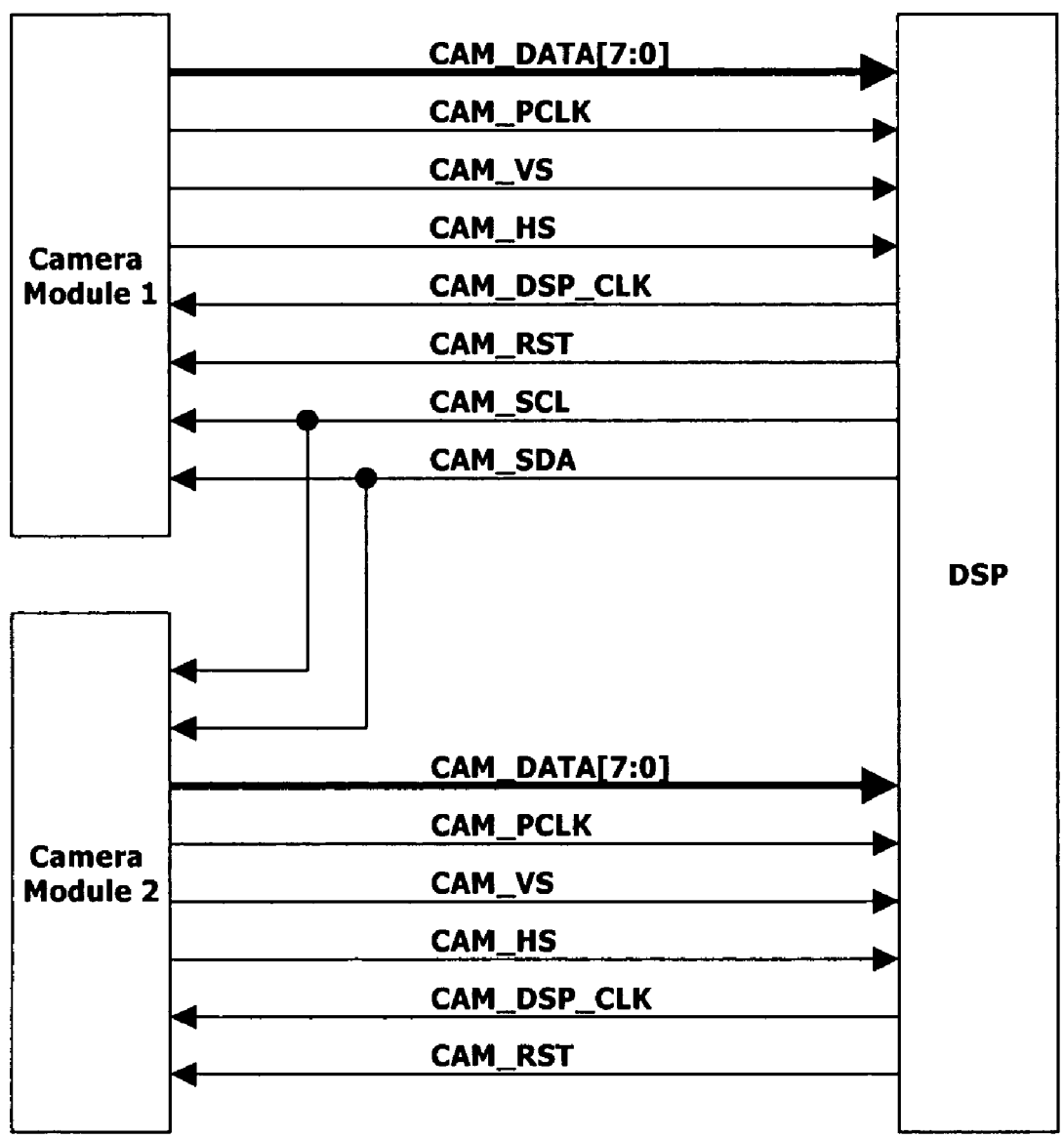
FIG. 3 illustrates signal lines and a signal flow between two conventional camera modules and a DSP (Digital Signal Processor)
Figure 4:
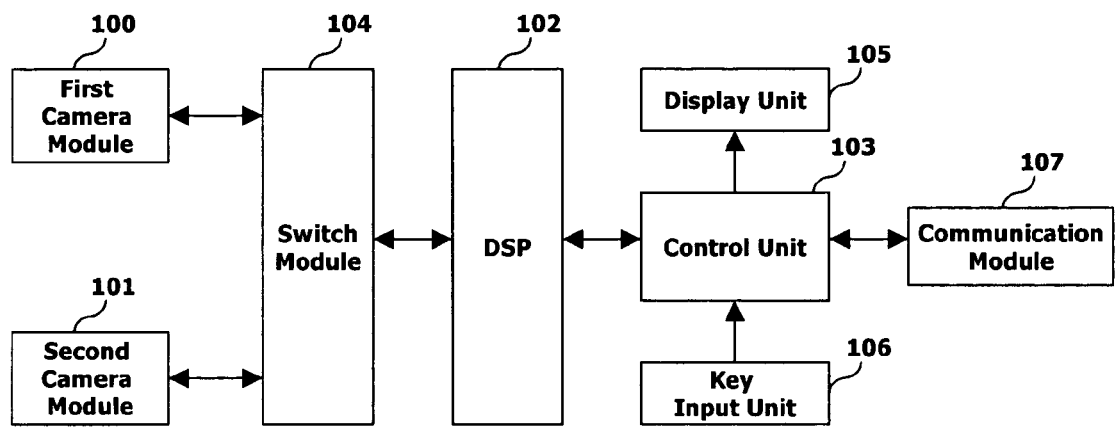
FIG. 4 illustrates a construction of an image signal processing apparatus in a mobile communications terminal having a dual camera in accordance with the present invention.

FIG. 4 is a block diagram illustrating an image signal processing apparatus in a mobile communications terminal having a dual camera therein in accordance with the present invention.

As shown in FIG. 4, an image processing apparatus in accordance with the present invention includes: first and second camera modules 100 and 101; a DSP (Digital Signal Processor) 102; a control unit 103 for performing various control operations; a switch module 104 located between the first and second camera modules 100 and 101 and the DSP 101, switching a switch control signal of the control unit 103 to the first and second camera modules 100 and 101, and switching image signals captured by the first and second camera modules 100 and 101 to the DSP 102; a key input unit 105; a display unit 106 for displaying captured images and various operations of the terminal; and a communication module 107 for receiving and transmitting image data.

The first and second camera modules 100 and 101 can be individually used according to specific capture modes in order to capture each subject in a different direction. For example, the first camera module 100 is used to capture a subject in an external direction (on the basis on a camera module) of the terminal (namely, the rear side of the terminal), and the second camera module 101 is used to capture a subject in an internal direction of the terminal (namely, the front side of the terminal).

Preferably, the first and second camera modules 100 and 101 can be used in different capture modes or in the same capture mode. For example, the first camera module is operated in a general camera mode and the second camera module is operated in a video communication mode. In addition, both the first and second camera modules 100 and 101 can be used in the general camera mode/video communication mode.

The DSP 102 transmits control signals outputted from the control unit 103 to the first and second modules 100 and 101, converts image signals received from the camera modules 100 and 101 through the switch module 104 into image data, and then outputs the converted image data to the control unit 103.

Figure 5:
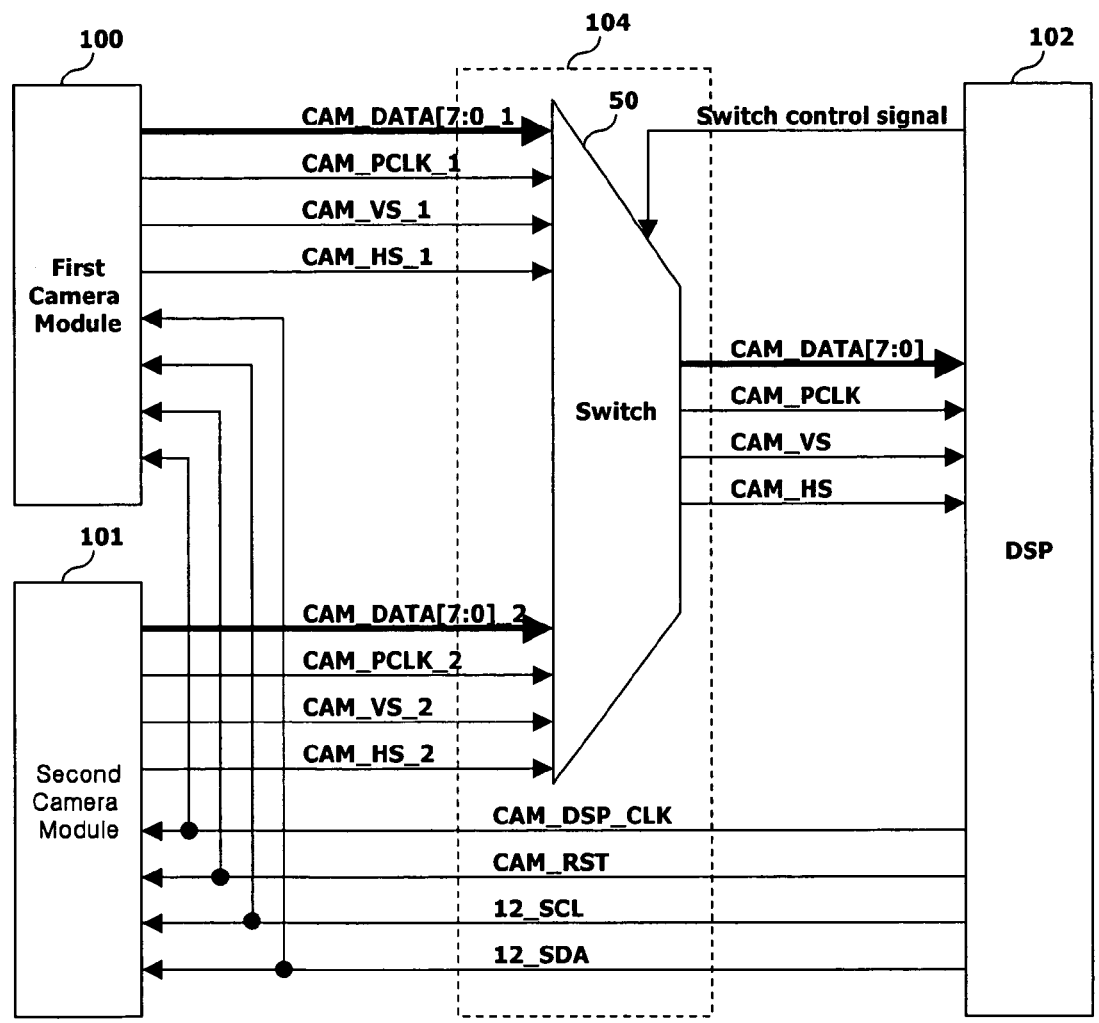
FIG. 5 illustrates signal lines and a signal flow between the dual camera module and a DSP.

FIG. 5 is a view showing relations of signal lines between the first and second camera modules 100 and 101, the switch module 104 and the DSP 102.

With reference to FIG. 5, the switch module 104 includes a switch 50 for switching image signals captured by the first and second camera modules 100 and 101 to the DSP 102 according to the switch control signal outputted from the DSP 102. The signal lines based on the switch 50 is connected using the FPCB. Accordingly, when the terminal has more than one camera module therein, the number of signal lines connected between the switch module 104 and the DSP 102 is almost the same as the number of signal lines used when one camera module is used, so that increases in cost and noise caused by the increased number of the signal lines can be reduced.

A first embodiment of a method for processing an image signal according to the present invention in a mobile communication terminal having a dual camera therein will be now described.

In the first embodiment of the method for processing an image signal in accordance with the present invention, a first camera module is used in a general camera mode and a second camera module is used only in a video communication mode.

First, if power is applied, a mobile communications terminal performs a base station registration procedure with a network and then becomes in a wait state. If a user selects the general camera mode through a key input unit 106 in order to capture a subject, the control unit 103 recognizes user's key input and outputs control signals to the DSP 102. Preferably, the general camera mode includes a capture menu for capturing a subject by the first camera module 100, an edit menu for editing captured data, and a transmit menu for transmitting the captured image data which is stored or edited to another device (e.g., a terminal). In the present invention, a description is made by taking a case that the user selects the capture menu as an example.

If the control signals are inputted from the control unit 103, the DSP 102 outputs operation control signals (CAM_DSP_CLK, CAM_RST, 12SCL and 12SDA) to the first camera module 100 via control lines and simultaneously outputs a switch control signal to the switch module 104 to thereby select the first camera module 100.

Thereafter, if the user moves the first camera module 100 to face toward an internal or external subject of the terminal and captures the subject, a captured image signal is transmitted to the DSP 102 through the switch module 104.

Accordingly, the DSP 102 converts a corresponding image signal into image data and outputs the converted image data to the control unit 103. The control unit 103 displays the image data from the DSP 102 on the display unit 105 and simultaneously stores the image data in a memory (not illustrated). If the user intends to transmit the captured image, the control unit 103 reads and outputs the image data stored in the memory to the communication module 107.

On the other hand, if the user manipulates the key input unit 106 and selects a video communication mode, the control unit 103 recognizes this and outputs control signals to the DSP 102. The DSP 102 outputs operation control signals (CAM_DSP_CLK, CAM_RST, 12SCL and 12SDA) to the second camera module 101 and simultaneously outputs a switch control signal to the switch module 104 according to the control signals of the control unit 103 to thereby select the second camera module 100.

Thereafter, if the user initiates video communication, a moving image signal captured in the second camera module 101 is transmitted to the DSP 102 through the switch 50 of the switch module 104, and the DSP 102 converts the corresponding moving image signal into image data and outputs the converted image data to the control unit 103. In addition, while the moving image is inputted, a voice signal being inputted through a microphone is converted into a digital signal through the DSP 102. The image and voice signals converted into digital signals are transmitted to another party's terminal through the communication module 107.

As so far described, the first embodiment of the method for processing an image signal in accordance with the present invention is used when two camera modules are used in different communication modes. However, the present invention can provide a method for processing an image signal which is also effective when two camera modules are used in the same communication mode.

That is, both the first and second camera modes 100 and 101 can be used in general camera mode/communication mode. In this case, the first and second camera modules 100 and 101 are used to capture subjects in different directions, respectively. For example, the first camera module 100 is used to capture a subject in an external direction (on the basis of the camera module) of the terminal and the second camera module 101 is used to capture a subject in an internal direction of the terminal.

Accordingly, if the user selects the general camera mode, the second camera module 101 is automatically selected, if the video communication mode is selected, the first camera module 100 is automatically selected. In this state, by appropriately selecting the first and second camera modules 100 and 101 again, the user performs external image capturing in the video communication mode or self image capturing in the general camera mode.

Hereinafter, a second embodiment of the method for processing an image signal in accordance with the present invention will be described.

If the user selects the general camera mode, the control unit 103 recognizes user's key input and outputs control signals to the DSP 102. The DSP 102 outputs operation control signals (CAM_DSP_CLK, CAM_RST and 12SCL, 12SDA) to the first camera module 100 via control lines and outputs a switch control signal to the switch module 104. Hence, if the user selects the general camera mode, the first camera module 100 is automatically selected.

In this state, the user can capture a subject in an external direction of the terminal by using the first camera module 100 or capture a subject in an internal direction of the terminal by using the second camera module 101 and then can store and transmit a captured image. For example, if the user selects the second camera module 101 in order to capture the internal subject (self image), the DSP 102 outputs a new switch control signal according to the control of the control unit 103. Accordingly, even in the general camera mode, an image signal captured by the second camera module 100 is inputted to the control unit 103 through the switch module 104 and the DSP 102.

Therefore, the control unit 103 displays image data inputted from the DSP 102 on the display unit 105 and stores the image data in a memory (not illustrated). If the user intends to transmit the captured image, the control unit 103 reads the image data stored in the memory and outputs the image data to the communication module 107.

On the other hand, if the user selects the video communication mode, the control unit 103 recognizes user's key input and outputs control signals to the DSP 102. The DSP 102 outputs operation control signals (CAM_DSP_CLK, CAM_RST, 12SCL and 12SDA) to the second camera module 101 via control lines and outputs a switch control signal to the switch module 104. As described, if the user selects the video communication mode, the second camera module 101 is automatically selected.

In this state, the user can capture a subject in an internal direction of the terminal by using the second camera module 101 or capture a subject in an external direction of the terminal by using the first camera module 100 and then can store and transmit a captured image. For example, if the user selects the first camera module 100 in order to capture the subject in the external direction of the terminal, the DSP 102 outputs a new switch control signal to the switch module 104 according to control of the control unit 103. Even in the video communication mode, an image signal captured by the first camera module 100 is inputted to the control unit 103 through the switch module 104 and the DSP 102.

Accordingly, the control unit 103 displays image data inputted from the DSP 102 on the display unit 105 and simultaneously stores the image data in a memory (not illustrated). If the user intends to transmit the captured image, the control unit 103 reads the image data stored in the memory and outputs the image data to the communication module 107.

As described, the present invention can reduce production costs by simplifying the circuit design for controlling each camera module by connecting each camera module to a DSP through one switch module positioned on a Flexible Printed Circuit Board (FPCB) when two camera modules are mounted. Especially, such a connection structure can remarkably improve product reliability by considerably reducing the number of signal lines required for the reception and transmission of control signals or image signals and by controlling noise which can be generated between the signal lines during the transmission and reception of data.

In addition, the present invention can capture a subject in an internal or external direction of the terminal and store/transmit a captured image during the video communication, and the present invention can capture a subject in an internal or external direction of the terminal and store/transmit a captured image in a general camera mode.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An image signal processing apparatus in a mobile communications terminal, comprising:
   a plurality of camera modules for capturing a subject;
   a digital signal processor (DSP) for outputting a switch control signal and control signals to control the plurality of camera modules according to a capture mode, and processing an image signal into a digital signal, wherein the capture mode indicates one of a general camera mode and a video communication mode; and
   a switch module distributing the control signals of the DSP to the plurality of camera modules, and selectively outputting image signals captured by the plurality of camera modules to the DSP according to the switch control signal
   wherein a first camera is automatically selected and the user performs a capturing operation by selecting a first and a second of the plurality of camera modules in the selected mode if the user selects the general camera mode and a second camera is selected and the user performs a capturing operation by selecting the first and the second of the plurality of camera modules in the selected mode if the user selects the video camera mode.

2. The apparatus of claim 1, further comprising:
   a control unit for controlling the DSP according to the user's capture mode and processing the digital signals inputted from the DSP.

3. The apparatus of claim 1, wherein the first camera module is used to capture a subject in an external direction of the terminal and the second camera module is used to capture a subject in an internal direction of the terminal.

4. The apparatus of claim 1, wherein the switch module is located on a Flexible Printed Circuit Board (FPCB).

5. The apparatus of claim 1, wherein the captured image signal is a still image or a moving image.

6. The apparatus of claim 1, wherein the switch module comprises a switch for selectively outputting the image signals captured by first and second camera modules to the digital signal processor.

7. A method for processing an image signal in a mobile communications terminal having a plurality of camera modules, the method comprising:
   outputting control signals for controlling the plurality of camera modules if a capture mode is selected; and
   distributing the control signals to the plurality of camera modules;
   selectively outputting image signals captured by the plurality of camera modules according to one control signal,
   wherein a first camera module is operated in a general camera mode and a second camera module is operated in a video communication mode.

8. The method of claim 7, wherein the control signal is a control signal for selecting one of the plurality of camera modules.

9. The method of claim 7, wherein the control signal is a switch module control signal for controlling a switch module that selectively outputs image signals captured by the plurality of camera modules.

10. The method of claim 7, wherein the captured image signal is a still image or a moving image.

11. The method of claim 7, wherein the first camera module is used to capture a subject in an external direction of the terminal and the second camera module is used to capture a subject in an internal direction of the terminal.

12. A method for processing an image signal in a mobile communications terminal having a plurality of camera modules, the method comprising:
   outputting-control signals and a first switch control signal for a capture mode if a user selects the capture mode;
   distributing the control signals to a first and a second of the plurality of camera modules and selectively outputting first image signals captured by the first and second camera modules according to the first switch control signal;
   outputting a second switch control signal if the user selects one of the first and second camera modules again in the same selected capture mode; and
   selectively outputting second image signals captured by the first and the second camera modules according to the second switch control signal, wherein the selected capture mode is one of a general camera mode and a video communication mode.

13. The method of claim 12, wherein both first and second camera modules are operated in general camera mode/video communication mode.

14. The method of claim 13, wherein if a user selects the general camera mode, a first camera is automatically selected, and the user performs a capturing operation by selecting the first and second camera modules in the selected mode.

15. The method of claim 13, wherein if a user selects the video communication mode, a second camera is automatically selected, and the user performs a capturing operation by selecting the first and second camera modules in the selected mode.

16. The method of claim 12, wherein the first and second switch control signals are set to be identical to or different from each other.

17. The method of claim 12, wherein the first image signal is a still image signal or a moving image signal and the second image signal is a still image signal.

* * * * *